Oct. 3, 1967  J. V. MAGEEAN ET AL  3,344,605
VARIABLE THRUST ROCKET ENGINE
Filed May 16, 1966
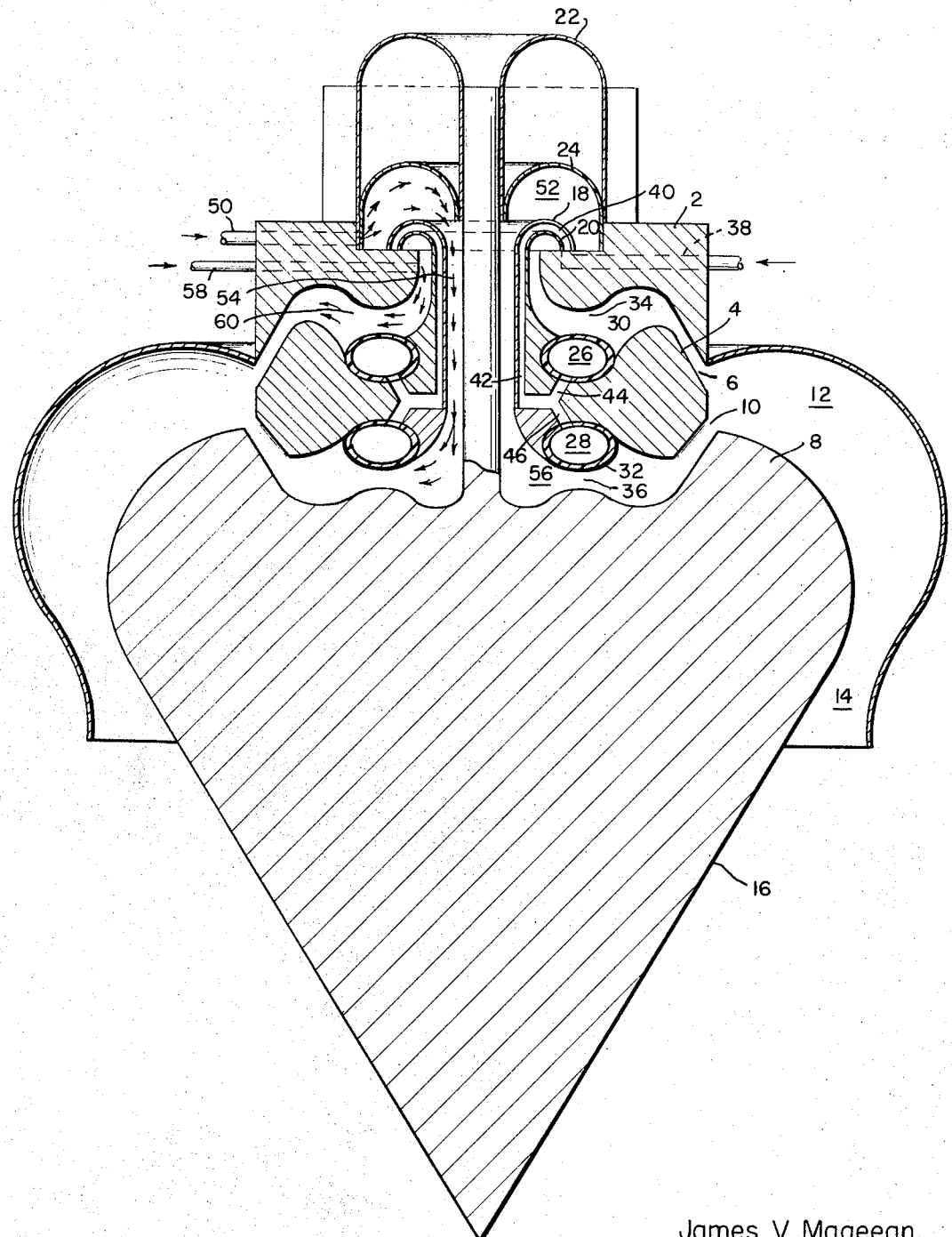
James V. Mageean,
Eugene V. Rutkowski,
INVENTOR.
BY
*Donald W. Graves*
ATTORNEY.

3,344,605
VARIABLE THRUST ROCKET ENGINE
James V. Mageean, Torrance, and Eugene V. Rutkowski, Los Angeles, Calif., assignors to TRW Inc., Redondo Beach, Calif., a corporation of Ohio
Filed May 16, 1966, Ser. No. 550,376
5 Claims. (Cl. 60—258)

This invention relates to gas generating devices.

More particularly, this invention relates to a rocket engine which has throttling capabilities.

It is often necessary to provide means whereby a rocket engine may be throttled over wide thrust ranges. The typical throttling mechanism comprises flow controlling valves upstream of the injector. The thrust range capable under this arrangement is usually in the neighborhood of a ratio of 2:1 or 3:1. Deeper throttling is not attainable while maintaining high efficiency due to the large pressure drop across the valves. This deeper throttling leaves little pressure drop across the injector which results in poor combustion characteristics. This is due to the lack of sufficient propellant velocity for intimate mixing of the propellant, particularly in a bipropellant rocket engine.

One approach to obviate the disadvantages of this arrangement has been to inject an inert gas to vary the propellant density while maintaining sufficient velocity. An example of this is seen in the U.S. patent to Morrell, No. 3,045,424.

A mechanical, variable area injector approach has been suggested. This necessitates complicated moving parts as well as having portions exposed to hot combustion chamber gases. An example of this is described in the U.S. patent to Dermody et al., No. 3,234,731.

Still another approach and one to which this invention is related is found in the U.S. patent to Elverum, No. 3,205,656, assigned to the assignee of this invention. In that patent a cavitating venturi is disclosed in combination with a variable area injector.

The concept described in the patent is based upon the relationship of upstream pressure and area such that flow is independent of downstream pressure. To maintain sufficient propellant injection velocity, the injector orifice area is varied along with area of the cavitating venturi.

This invention represents a departure from the Elverum patent and in certain applications an improvement thereover. Basically the invention comprises a fixed injector portion and a movable plug and a separately movable injector portion. The fixed and movable injector portions along with the movable plug form annular cavitating venturis and injector ports. The cavitating venturi area is controlled by hydraulic pressure in flexible annular manifolds. The injector port areas are controlled by the downstream propellant pressure to insure proper injection velocity.

The objects and advantages of this invention will become apparent as this description proceeds taken in conjunction with the drawing in which:

The figure is a view, partially in cross section of a gas generating device or rocket engine constructed according to this invention.

Referring now to the figure, a fixed injector portion or housing 2 is provided. An annular movable plug 4 forms with housing 2 an annular injector port 6. A "spike" or movable plug forms part of the injector assembly and is shown at 8. Movable injector portion 8 forms with plug 4 an annular injector port 10. Propellant injected through annular ports 6 and 10 will impinge upon each other and ignite and form hot combustion gases in annular combustion chamber 12. These gases will exit through throat region 14 and expand against surface 16 to provide thrust. Ignition can be hypergolic or may be initiated by an igniter.

Annular plug 4 is attached to fixed wall portion 2 by means of annular springs 18 and 20. These springs bias plug 4 toward wall 2. In a similar manner, movable assembly portion 8 is biased by annular spring members 22 and 24 toward plug 4 and fixed wall 2.

Annular manifolds 26 and 28 are provided on plug 4. These manifolds have flexible walls 30 and 32 respectively. When fluid is introduced under pressure into manifolds 26 and 28, they will tend to expand, thus reducing annular areas 34 and 36 respectively. These annular areas represent the cavitating venturi portion corresponding to that described in aforementioned U.S. Patent No. 3,205,656. The pressure admitted to these manifolds is provided by fluid entering conduit 38 and then enters annular manifold 40 and by means of conduits 42, 44 and 46 will pressurize manifolds 26 and 28.

Propellant such as fuel enters conduit 50 by a source not shown and will flow into manifold 52 formed between springs 18 and 24. The propellant will flow in the direction of arrows 54 into manifold 56 and through cavitating venturi 36 and thence through injector port 10 into combustion chamber 12.

In a similar manner, propellant such as oxidizer will flow through conduit 58 into annular injector passage 60 through cavitating venturi 34 and injected into combustion chamber 12 through annular injector port 6.

As previously mentioned, the spring bias will tend to draw movable injector portion 8 and plug 4 toward fixed injector portion 2 tending to close the venturi areas 34 and 36 and injector ports 6 and 10. In opposition to this the propellant flow into the combustion chamber will create pressure tending to keep the injector ports open. Thus, as the pressure downstream of cavitating venturi 34 and 36 decreases, injector portion 8 and plug 4 will be biased toward fixed injector portion 2 so as to reduce the area of injector ports 6 and 10.

This will maintain injection velocity to aid in mixing of the propellant.

Throttling of the engine is accomplished by varying the fluid pressure in manifolds 26 and 28. Increasing pressure in these manifolds decreases the cavitating venturi areas resulting in a throttled condition. When this throttled condition occurs, the pressure downstream of the venturi will decrease.

The operation of the device is as follows:

Assuming a stable operating condition in which the fixed injector portion 2, annular plug 4 and movable injector portion 8 are in a fixed relationship to each other, increased thrust is accomplished by reducing fluid pressure in conduit 38 and thus manifolds 26 and 28. By reducing pressure in these manifolds the area of annular cavitating venturis 34 and 36 will increase. When this occurs, pressure downstream thereof will increase tending to move plug 4 away from housing 2 and plug 8 away from plug 4 thus increasing the area of injector ports 6 and 10. The net result of this is increased propellant flow and hence, increased combustion in combustion chamber 12 and therefore greater thrust.

To reduce thrust, pressure in manifolds 26 and 28 is increased which reduces the gap or area of venturis 34 and 36. Should elements 8 and 4 remain in the same position, propellant velocity through ports 6 and 10 will decrease which can result in combustion instability. However, by providing the bias of the annular springs, movable injectable portion 8 will move toward plug 4 which also moves toward fixed injector portion 2 resulting in decreased injector port areas. This increases the velocity through these ports thus maintaining combustion stability which is a function of propellant velocity during the mixing phase.

Having described this invention it is to be understood that it is to be limited only by the scope of the claims appended hereto.

What is claimed is:
1. A gas generating device comprising;
a combustion chamber,
an injector assembly comprising;
a fixed injector wall,
an annular plug adapted to move toward and away from said wall,
a movable injector wall, said movable wall being adapted to move toward and away from said plug and said fixed wall,
bias means between said fixed wall and said plug adapted to bias said plug toward said fixed wall,
bias means between said movable wall and said fixed wall adapted to bias said movable wall toward said fixed wall and said plug,
means to inject a first propellant between said fixed wall and said plug,
means to inject a second propellant between said plug and said movable wall,
a first cavitating venturi formed between said fixed wall and said plug, and
a second cavitating venturi formed between said plug and said movable wall.

2. A gas generating device according to claim 1 and further including injector ports formed between said fixed wall and plug and said plug and movable wall.

3. A gas generating device according to claim 1 wherein said bias means comprise annular springs.

4. A gas generating device according to claim 1 wherein the area of said cavitating venturis is variable.

5. A gas generating device according to claim 4 wherein said variable cavitating venturis are formed in part by annular flexible manifold walls adapted to be pressurized by fluid whereby to vary the area of said cavitating venturis.

No references cited.

MARK M. NEWMAN, *Primary Examiner.*

D. HART, *Assistant Examiner.*